(12) United States Patent
Liong

(10) Patent No.: US 6,665,746 B1
(45) Date of Patent: Dec. 16, 2003

(54) SYSTEM AND METHOD FOR PRIORITIZED CONTEXT SWITCHING FOR STREAMING DATA MEMORY TRANSFERS

(75) Inventor: Thomas S. Liong, San Jose, CA (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/540,773

(22) Filed: Mar. 31, 2000

(51) Int. Cl.$^7$ .............................................. G06F 13/28
(52) U.S. Cl. ............................. 710/22; 710/26; 710/40; 709/103; 709/108
(58) Field of Search ............................. 710/22–24, 26, 710/33, 42, 48

(56) References Cited

U.S. PATENT DOCUMENTS

| | | | | |
|---|---|---|---|---|
| 5,251,303 A | * | 10/1993 | Fogg et al. | 710/24 |
| 5,802,546 A | * | 9/1998 | Chisholm et al. | 711/100 |
| 5,894,560 A | * | 4/1999 | Carmichael et al. | 710/25 |
| 6,105,075 A | * | 8/2000 | Ghaffari | 710/5 |
| 6,105,080 A | * | 8/2000 | Holt et al. | 710/26 |
| 6,298,403 B1 | * | 10/2001 | Suri et al. | 710/100 |
| 6,389,449 B1 | * | 5/2002 | Nemirovsky et al. | 709/108 |
| 6,418,489 B1 | * | 7/2002 | Mason et al. | 710/22 |

* cited by examiner

Primary Examiner—Jeffrey Gaffin
Assistant Examiner—Eron J. Sorrell
(74) Attorney, Agent, or Firm—Dorsey & Whitney LLP (57) ABSTRACT

Method of streaming data transfers from scattered locations or to a gathered location in a memory, including the steps of manipulating the transfer of data between memory devices by processing, an element at a time, entries in a first scatter/gather list; upon receipt of a request to process a second scatter/gather list, interrupting the processing of the first list; and resuming the processing of the first list upon the completion of the processing of the second. In one embodiment, the step of interrupting the processing of the first scatter gather list interrupts only at the completion of the processing of an element of the first scatter/gather list and prior to the retrieval of the next element in the first scatter/gather list. In another embodiment, the interrupting step further includes storing the next address to be processed in the first scatter/gather list, and retrieving the first element in the second scatter/gather list. Provides a scatter/gather mechanism for streaming transfers between a first and second memory device without processor or firmware intervention. The mechanism comprises: a transfer engine for streaming data transfers between dispersed locations in one memory to a gathered location in a second memory, means for suspending processing of a current transfer request upon the receipt of a second request, and means for resuming the processing of a suspended transfer request including a pointer for indicating the starting address of a next element to be processed in a suspended transfer operation. Computer program and computer program product are also provided.

22 Claims, 5 Drawing Sheets

SYSTEM AND METHOD FOR PRIORITIZED CONTEXT SWITCHING FOR STREAMING DATA MEMORY TRANSFERS

FIELD OF THE INVENTION

The present invention relates generally to computing systems, and more particularly to system, method, and apparatus for streaming data transfers to and/or from scattered or non-contiguous locations in a memory.

BACKGROUND

In a computing system, related data, in the form of an executable file or data set, often is required to be stored in a memory element in blocks which may not be contiguous. While it may be ideal to store related data at contiguous locations in a memory, memory is not always able to be allocated to support this type of storage., for example, when the required number of storage locations is not available in a contiguous block. Problems arise in the transfer of this type of dispersed (yet related) data to and from a memory device. For example, system memory for a computing system may contain blocks of related data which are dispersed across system memory. When the blocks of related data are required for local processing, the processor (or some other resource) must oversee the gathering of the dispersed related data for transfer into local memory.

The transfer of "scattered" data may be overseen by the processor. That is, the processor may be required to keep track of the scattered locations in memory associated with the related data blocks and also track the progress of the transfer. Alternatively, a scatter/gather mechanism may be employed. A scatter/gather mechanism is commonly used to stream data transfers from scattered locations or to a gathered location in a memory. A scatter/gather mechanism transfers scattered data without requiring processor (firmware) intervention. In operation, upon identifying an object (related data) for transfer, executing firmware or software creates a linked list of memory locations to be retrieved. This list (the "scatter/gather list") is transferred to a scatter/gather mechanism, which performs transfers using the list. Each individual segment in a scatter/gather list includes information about the data to be transferred and a linking address to the next address in memory for a next list segment to be processed. Individual list segments are processed by the scatter/gather mechanism sequentially until the end of the scatter/gather list is reached.

In some situations, a problem arises in the use of the scatter/gather mechanism. Typically in conventional systems and methods, once a scatter/gather mechanism begins the processing of a scatter/gather list, the resources associated with the transfer cannot be shared by others. Accordingly, transfer resources, such as a Direct Memory Access (DMA) engine associated with the scatter/gather processing, are dedicated to that process and cannot be used or shared by any other process until the processing of a scatter/gather list has been completed. Typically, if a processor (CPU) desired to interrupt the scatter/gather mechanism, any scatter/gather operation in progress had to be aborted. This was due primarily to the lack of visibility that the processor has to the scatter/gather operation.

Alternatively, software or firmware in the computing system can be used to track the status of the hardware as it progresses through the scatter/gather list processing. While this type of solution might allow for the interruption of a scatter gather operation, it minimizes the efficiency gains achieved in having separate scatter/gather hardware.

There therefore remains a need for a system and method that provide a scatter/gather mechanism which is able to be interrupted during scatter/gather list processing and which is capable of resuming processing of an interrupted scatter/gather list at a future time.

SUMMARY OF THE INVENTION

A method of streaming data transfers from scattered locations or to a gathered location in a memory, including the steps of manipulating the transfer of data between memory devices by processing, an element at a time, entries in a first scatter/gather list; upon receipt of a request to process a second scatter/gather list, interrupting the processing of the first scatter/gather list; and resuming the processing of the first scatter/gather list upon the completion of the processing of the second scatter/gather list. In one embodiment, this first method is further defined such that the step of interrupting the processing of the first scatter gather list interrupts only at the completion of the processing of an element of the first scatter/gather list and prior to the retrieval of the next element in the first scatter/gather list. In another embodiment, the method is further defined such that interrupting step further includes storing the next address to be processed in the first scatter/gather list, and retrieving the first element in the second scatter/gather list.

In yet another embodiment, the method is further defined such that the first scatter/gather list has a first priority, and the second scatter/gather list has a second priority; and the interrupting step is only performed if the priority of the second scatter/gather list is higher than the priority of the first scatter/gather list. This latter embodiment may also optionally provide that if the priority of the second scatter/gather list is lower than the priority of the first scatter/gather list, the method further comprises the step of delaying the processing of the second scatter/gather list until the processing of the first scatter/gather list is complete. This may be further defined to optionally provide that the step of delaying the processing of the second scatter/gather list further includes the step of storing the address in memory of the first element of the second scatter/gather list.

In another embodiment the invention provides a scatter/gather mechanism for streaming transfers between a first and second memory device without processor or firmware intervention. The the scatter/gather mechanism comprises: a transfer engine for streaming data transfers between dispersed locations in one memory device to a gathered location in a second memory device, means for suspending the processing of a current transfer request upon the receipt of a second transfer request, and means for resuming the processing of a suspended transfer request including a return pointer for indicating the starting address of a next element to be processed in an transfer operation which has been suspended.

In yet another embodiment, the invention provides a scatter/gather mechanism for streaming transfers of data between a first and second memory device without processor or firmware intervention where the data is transferred between the memory devices in segments according to instructions in a scatter/gather list, and where the scatter/gather mechanism services a single transfer request at a time. The scatter/gather mechanism includes a transfer engine for streaming transfers between dispersed locations in one memory device to a gathered location in a second memory device; and a transfer controller for processing transfer requests including a processing procedure for processing a scatter/gather list associated with a current transfer request, and an interrupt procedure for servicing a priority transfer request by suspending the current transfer request until the completion of the servicing of the priority transfer request.

In still another embodiment, the invention provides a computer system including a processor and first and second memory devices where the computer system includes: means for streaming transfers of data between the first and the second memory devices without intervention of the processor or firmware and including a scatter/gather means, where the data is transferred between the first and second memory device in segments according to instructions in a scatter/gather list, the scatter/gather means services a single transfer request at a time; and the scatter/gather means further includes a transfer engine streaming transfers between dispersed locations in the first memory device to a gathered location in a second memory device, and a transfer controller for processing transfer requests including: first processing means for processing a scatter/gather list associated with a current transfer request, and an interrupt means for servicing a priority transfer request by suspending the current transfer request until the completion of the servicing of the priority transfer request.

The invention also provides computer program, software, and firmware providing a computer program mechanism including a program module that directs the computer system or components thereof, to function in a specified manner to stream data transfers from scattered locations or to a gathered location in a memory, the program module including instructions for: manipulating the transfer of data between memory devices by processing, an element at a time, entries in a first scatter/gather list; and upon receipt of a request to process a second scatter/gather list, interrupting the processing of the first scatter/gather list; and resuming the processing of the first scatter/gather list upon the completion of the processing of the second scatter/gather list.

In a further embodiment of the invention, multiply nested processing is provided in association with the above described system, apparatus, method, and computer program and computer program product.

The invention provides several features and advantages over conventional systems and methods. One advantage is that multiple scatter/gather operations may be prioritized and processed by the scatter/gather mechanism. Another advantage is that a processor may assign a priority to a scatter/gather operation and interrupt an ongoing scatter/gather operation in order to allow for the processing of a higher priority task. Hence the invention provides prioritized switching between tasks. Yet another feature and advantage of the invention is that it is simpler in design and the use of a single scatter/gather engine and a single DMA engine that are shared by multiple prioritized scatter/gather lists reduces costs and required silicon (chip) area as compared to providing multiple scatter/gather engines and multiple DMA engines to support multiple prioritized scatter/gather list. Furthermore, the processor or CPU does not have to be involved ("baby sit") the ongoing scatter/gather operation thus reduces overhead and improves overall system performance, this because it is done automatically through the prioritized scatter/gather context switching. Other advantages and features will be apparent from the following description and claims.

DETAILED DESCRIPTION OF EMBODIMENTS OF THE INVENTION

Figure 1:
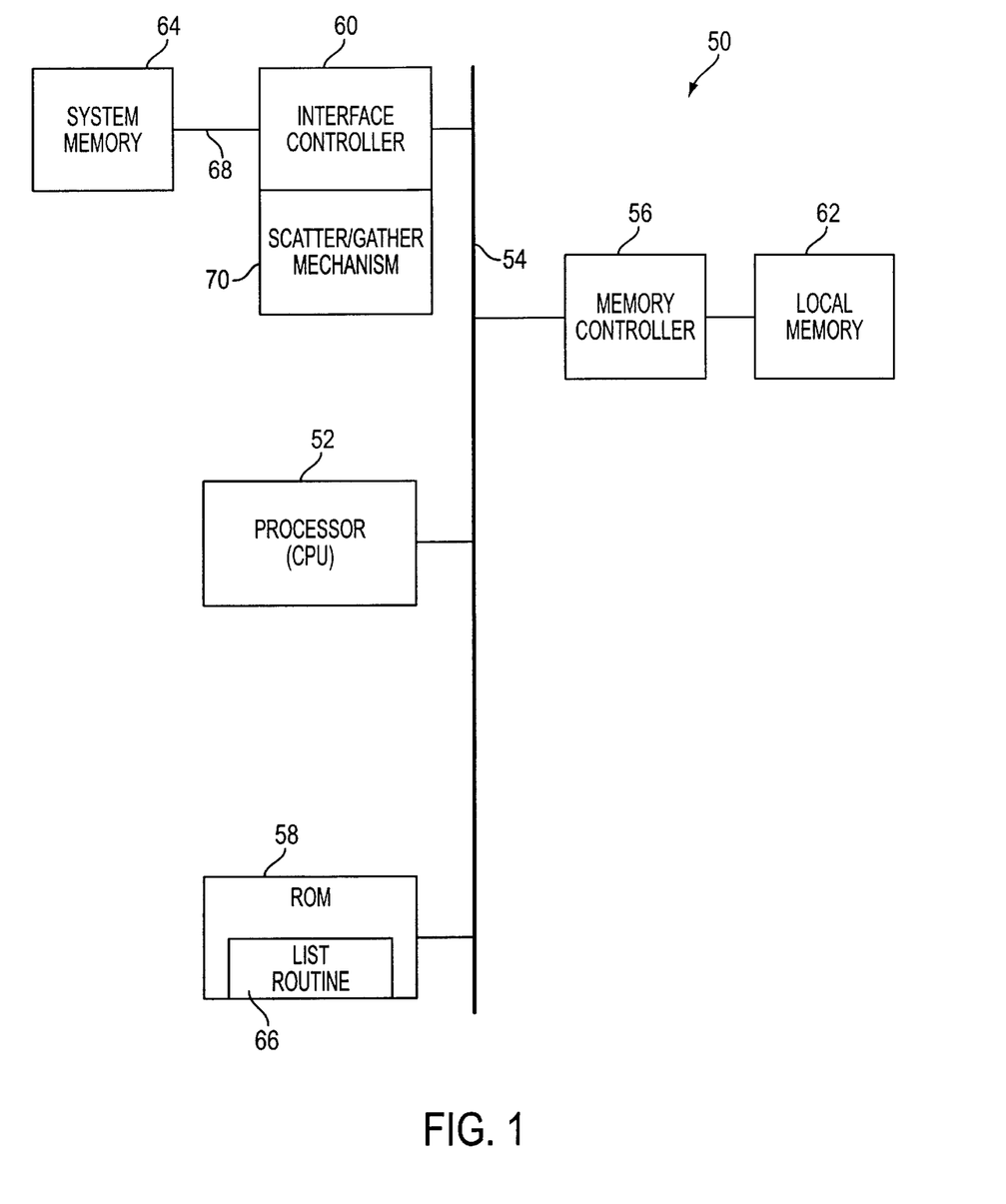
FIG. 1 is a schematic block diagram of a distributed computing system.

The present invention may be used in or in conjunction with various computing systems as a means for streaming data transfer operations. Such computing system include for example, interconnected networks of computers, distributed computing systems, stand alone computers, device controllers such as a RAID or other storage or device subsystem controller, and other information appliances. Referring to FIG. 1, an exemplary distributed computing system 50 includes a processor (CPU) 52 connected by a bus 54 to a memory controller 56, a read only memory (ROM) 58 (or other type of memory suitable for program storage, such as RAM) and an interface controller 60. Other conventional elements such as are known in the art may also be present in the computer system 50 but are not specifically described here to avoid obscuring the inventive features. For example, other input/output and user interface devices such as keyboard, pointing device, display or monitor, printers, network interface cards, hard disk or other storage devices and the like may also be present. The computer system 50 will also include an operating system and application programs. Memory controller 56 is coupled to a local memory 62. Interface controller 60 is coupled by a bus 68 to system memory 64. ROM 58 includes (stores) one or more procedures in the form of executable computer programs (a "scatter/gather list" procedure or routine) 66 for creating a scatter/gather list 72 in order to transfer dispersed data between system memory 64 and local memory 62. Interface controller 60 includes a scatter/gather mechanism 70 for processing scatter/gather lists generated by processor 52. System memory may, for example, comprise am amount of random access memory or RAM as is known in the art.

During operation, any requirement for the scattering or gathering of dispersed data results in the execution of the scatter/gather list procedure stored in ROM 58 by CPU 52. The scatter/gather list 72 is stored in local memory 62. Thereafter, CPU 52 transfers the starting address for the first list element to the scatter/gather mechanism 70 in interface controller 60 to initiate the scatter (or gather) process. The scatter/gather mechanism 70 controls the transfer of data between local memory 62 and system memory 64.

Various types of computing systems, including distributed computing systems may benefit from operation of the inventive system and method. For example, one type of distributed computing system that can benefit from the present invention is a redundant array of independent disks (RAID) controller. A RAID controller manages the transfer of data between a host and one or more storage devices (typically hard magnetic disks) in a memory system. Memory system refers to a memory controller and the controlled memory itself. System memory refers to the memory that resides in the Host system as compared to local memory which is located in the RAID controller. In operation, the RAID controller often requires the transfer of data (in the form of either an application program or program data set) from system memory (associated with the host) to its own local memory (within the RAID controller). Here, the RAID controller may be considered a component of a larger system. Other components of such system (such as network controller) manages transfer data between host and network devices. As long as manipulation of transfer is required, the scatter and gather mechanism provided by the invention is advantageously used.

System memory is located in the system (or Host) the local memory is located in the RAID controller. Since the Interface controller that contains the DMA engine and scatter/gather sequences is located within the RAID controller, the description provided here is somewhat controller centric, thus the memory that resides on or within the RAID controller is called local memory.

Often the RAID controller data transfers require the gathering of dispersed data in the system memory 64 (e.g. memory within the system/host) for transfer to local memory 62 (e.g. memory within the RAID controller) or the scattering of data resident in local memory 62 out to dispersed locations in the system memory 64. Accordingly, a scatter/gather mechanism may be employed to perform such functions.

Figure 2:
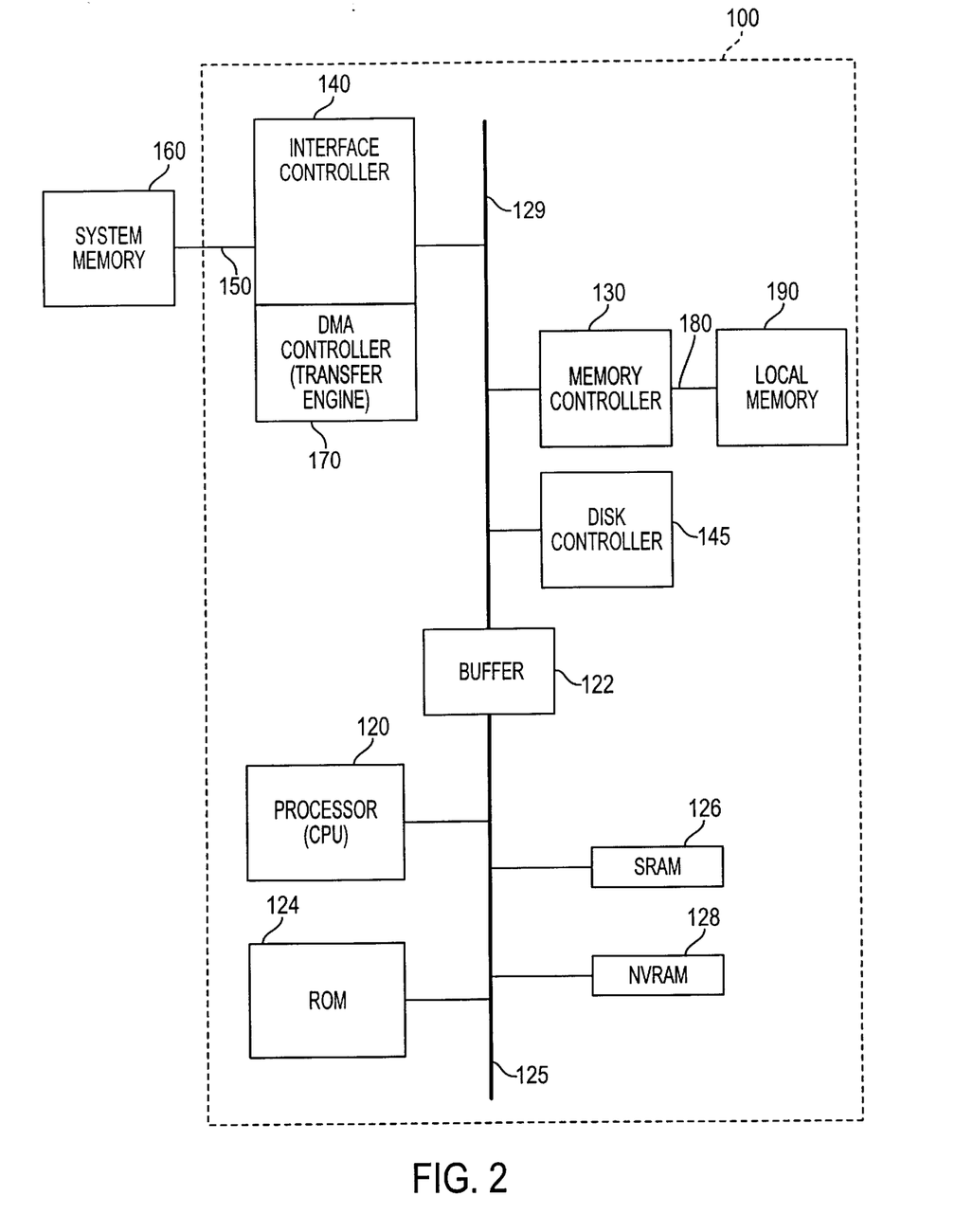
FIG. 2 is a schematic block diagram of a RAID controller according to one embodiment of the present invention.

With reference to FIG. 2, in one embodiment of the present invention, a RAID controller 100 includes a central processor (CPU) 120 connected by a local bus 125 to a buffer 122, flash read only memory (ROM) 124, static random access memory (SAM) 126 and a non-volatile random access memory (NVRAM) 128. Attached to buffer 122 is a transfer bus 129 which is also coupled to a memory controller 130, an interface controller 140, and one or more disk controllers 145. Associated with buffer 122 is a bus arbiter (not shown). The bus arbiter controls data and address transfers from local bus 125 to transfer bus 129.

Attached to interface controller 140 is a host bus 150 which in turn is coupled to a system memory 160. Associated with interface controller 140 is a DMA transfer engine 170. Memory controller 130 is coupled by a bus 180 to a local memory 190. In one embodiment of the present invention, local memory 190 is a dynamic random access memory (DRAM), interface controller 140 is a 64 bit PCI interface controller, and CPU 120 is part number i960HA-33, produced by Intel Corporation of Santa Clara, Calif. These particular components are exemplary and the invention is not limited to these particular vendor components.

In operation, RAID controller 100 will typically require the transfer of data between system memory 160 and local memory 190. The transfer requested may be from a sequence of memory locations which are not contiguous in the source device, here the system memory 160. Accordingly, a scatter/gather procedure is employed. In one embodiment of the present invention, firmware resident in flash ROM 124 is executed by CPU 120 each time a scatter or gather operation needs to be performed. Typically, the gather operation requires the gathering of scattered data from system memory 160 for transfer to local memory 190. Conversely, the scatter operation requires the transfer of gathered data from local memory 190 to scattered locations in system memory 160. Alternatively, the scattering and gathering of data may be from dispersed locations in local memory 190 for transfer to contiguous locations in the system memory 160. It is noted that except where otherwise stated, scatter/gather is a commonly used technique for data transfer, and a variety of techniques are known in the art.

The inventive structure and method are compatible with these known techniques and does not necessitate to use of any particular technique. The invention shows how these same scatter/gather techniques may be used with a prioritized scheme so that it can be used as context switching between multiple scatter/gather lists.

Figure 3:
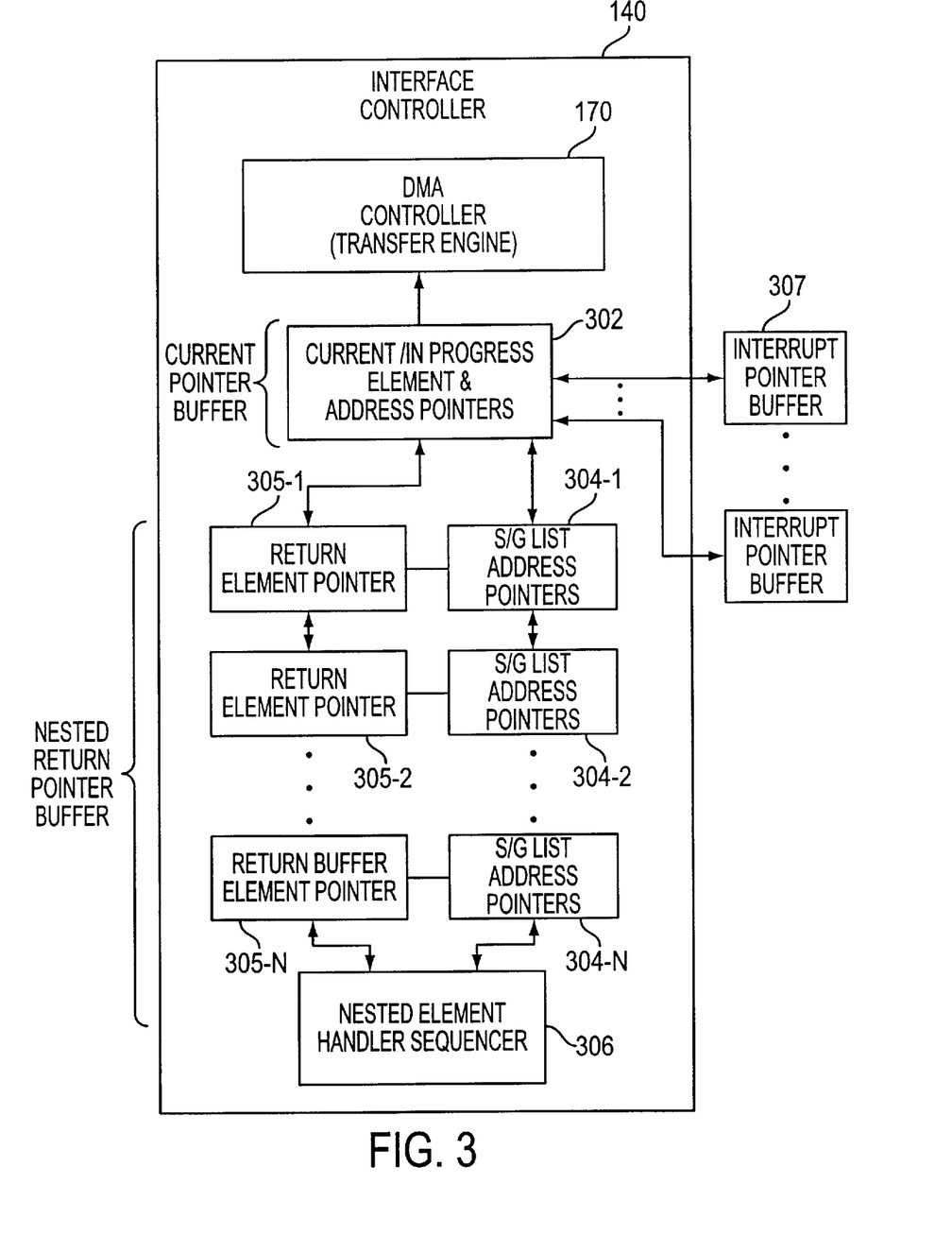
FIG. 3 is a schematic block diagram of an interface controller according to one embodiment of the present invention.

With reference to FIG. 2 and FIG. 3, interface controller 140 includes a DMA transfer engine 170, a current buffer 302, one or more nested pointer buffers 304, and a data handler 306. Associated with each nested pointer buffer are interrupt address pointer 304 and a return element pointer 305.

Nested element handler 306 controls the scatter/gather operation by tracking the nested return buffer in order of its priorities. The higher the priority the sooner it will it get service by the DMA engine. DMA transfer engine 170 performs data transfers between system memory 160 (See FIG. 2) and local memory 190 (See FIG. 2) by processing and executing the scatter/gather (S/G) element loaded into it. The current scatter/gather list is processed by the DMA engine one element at a time until finish or it may get interrupted due to a higher priority scatter/gather list.

Current pointer buffer 302 stores a singular address 320 associated with the starting address 322 of the next element to be processed in a scatter gather list 324. The scatter/gather list 72 is stored in the local memory. Current pointer buffer 302 is loaded with the next address information (link address 76) each time a current list element is retrieved from local memory 190. Retrieval of the next address (link address 76) ensures the next element to be executed by the DMA is known and ready. As soon as the current element has been processed by the DMA, the next address information is used to fetch the next scatter/gather element to be executed. Retrieval is accomplished over transfer bus 129, through memory controller 130, memory bus 180, local memory 190, by interface controller 140 (See FIG. 2).

Each nested return pointer buffer 304 stores the return element pointer associated with the next element in a scatter/gather list 74 and may optionally include priority information. The associated nested return pointer buffer 305 stores the address of the next list element and the scatter/gather list address pointer for the scatter/gather list which was interrupted by the processing of the higher priority scatter/gather list. Accordingly, the scatter/gather list address pointer 304 indicates the address at which the original scatter (or gather) operation may be resumed after completing the higher priority task. The return element pointer 305 stored in each nested return pointer buffer indicates the next element to be processed when the operation of the scatter/gather list pointed by the scatter/gather address pointer 304 resumes.

In operation, nested element handler sequencer 306 within interface controller 140 receives scatter/gather requests from CPU 120 (See FIG. 2) via local bus 125, buffer 122, and transfer bus 129, for processing the scatter/gather list 72. The use of scatter/gather procedures and the generation of scatter/gather lists is known in the art. Typically, a scatter/gather list includes one or more list elements each of which define a block of localized data to be transferred.

Figure 4:
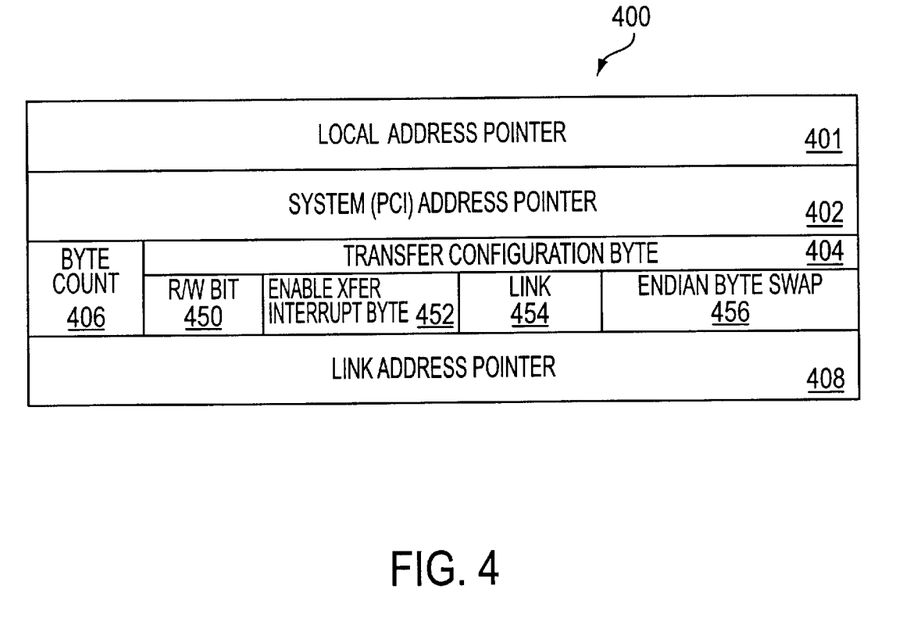
FIG. 4 is a schematic diagram of a data structure for a scatter/gather list element according to one embodiment of the present invention.

With reference to FIG. 4, in one embodiment of the invention the data structure 400 for an element within the scatter/gather list typically includes a local address pointer 401, a system address pointer 402 (such as a PCI address pointer), a transfer configuration byte 404, a byte count 406, and a link address pointer 408.

With respect to FIG. 2 and FIG. 4, local address pointer 401 indicates the starting address in local memory 190 (See FIG. 2) into which data is to be sourced (gathered) or targeted (scattered). That is, local address pointer 401 indicates the starting address in local memory 190 from which data is read if the scatter/gather operation requested requires a transfer from local memory 190 to system memory 160. Conversely, the local address pointer 401 may indicate the starting address in local memory 190 where data is to be written if the scatter/gather operation requested requires a transfer from system memory 160 to local memory 190.

System address pointer 402 (in one embodiment a PCI address pointer) indicates the starting address in system memory 160 associated with the data block to be transferred (again either source or target). PCI address pointer is used synonymously with system address pointer. In this exemplary embodiment, the system address pointer is referred to as the PCI address pointer because the interface of the RAID controller interface to the system is through PCI bus.

Byte count 406 indicates the number of data bytes to be transferred from contiguous memory locations starting at the address indicated by the appropriate address pointer, that is, either local address pointer 401 or system address pointer 402.

Transfer configuration byte 404 includes a read/write bit (R/W bit) 450, an enable transfer interrupt bit (ENABLE XFER) 452, a link bit (LINK) 454, and an Endian byte swapping bit (ENDIAN BYTE SWAP) 456.

Read/write bit 450 defines the direction of the data transfer. In one embodiment, when the read-write bit is set to "1", a read operation of the local memory 190 (See FIG. 2) results in the transfer of data from the local memory 190 to system memory 160. When the read/write bit 450 is "0", a read operation of the system memory 160 (see FIG. 2) results in the transfer of data from the system memory 160 to the local memory 190.

Enable transfer interrupt bit 452 is used to enable/disable the interrupt to the CPU upon finishing the process of this element. Typically, the interrupt to the CPU is generated at the end of the scatter/gather list (the last element of the scatter/gather list has this bit enabled) to inform the CPU that such operation has been successfully executed. Without the priority context switching capability, as provided by this invention, the CPU may have to be interrupted at the end of each element executed. (This bit enabled on every element.) This will enable the CPU to track the progress of the scatter/gather list, however, this is not very efficient and takes a lot of valuable CPU resources. Scatter/gather list data transfer performance will also degrade.

Link bit 454 identifies either that there is or there is not any other element on the scatter/gather list depending upon its state. When this link bit is set (e.g. "1" there are more scatter/gather elements to be linked in the current scatter/gather list. When set, (e.g., "1") link address pointer 408 indicates the starting address in local memory for the next list element. Accordingly, the last scatter/gather list element has this bit reset (e.g., "0") and in such case, any address in link address pointer 408 is ignored.

The Endian byte swapping bit 456 is an operation in which the data being transferred needs to be manipulated of its Endianess. Interfacing the different Endianess (little to big Endian or vise versa) is simplified if the scatter/gather element provides the information whether transfer of data needs to be Endianess manipulated or converted.

In operation, each of the scatter and gather operations typically require similar data processing, the principal difference being the direction of data transfer. Accordingly, for the purposes of this discussion, only a general scatter/gather operation is described in detail. Those workers having ordinary skill in the art will recognize that the discussion is equally suited to either a scatter or a gather operation with only minor differences between the two, such differences pertaining generally to the direction of the data transfer, and optional bits to help in the efficiency of the data transfer. Such differences are noted where appropriate.

Figure 5:
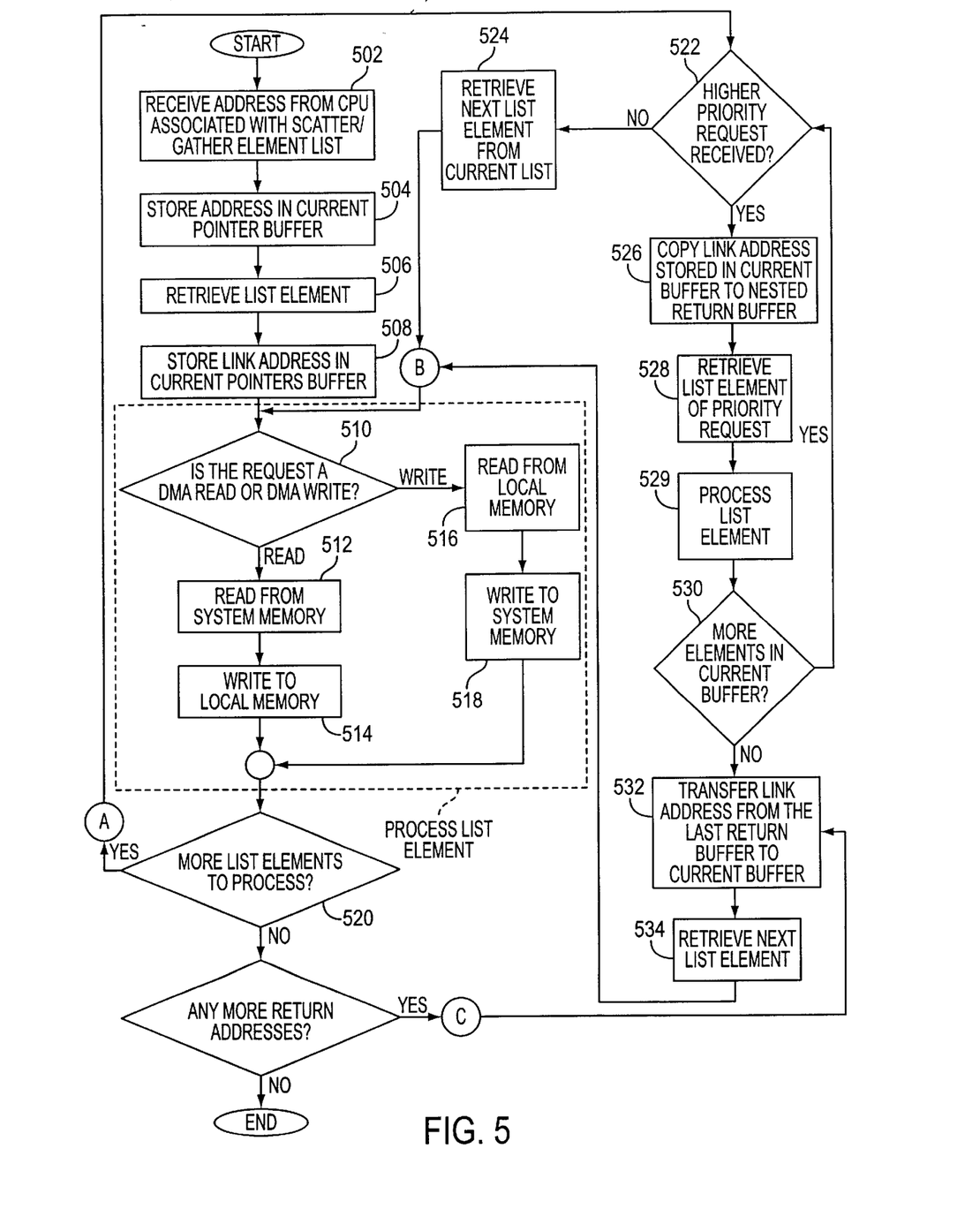
FIG. 5 is a flow chart of a method of executing scatter/gather operations according to one embodiment of the present invention.

Referring to FIG. 2, FIG. 3, and FIG. 5, a prioritized contact switching process 500 for performing nested or multiply-nested scatter/gather operations is described. By "multiply nested" we mean multiple scatter/gather lists can be processed and nested based on priority. With particular reference to the flow chart illustration of an embodiment of a method of executing nested scatter/gather operations in FIG. 5, a first scatter/gather list 72 (72-1) is generated (Step 501) by logically cascading scatter/gather elements 400 done by firmware stored in ROM 58 and CPU 120. After generation, the first scatter/gather list 72-1 is received by interface controller 140 (Step 502). Specifically, CPU 120 provides interface controller 140 with the address of the first location in local memory where the first element in the first scatter/gather list 72-1 is stored. CPU 120 has the first local memory location by virtue of the firmware running on it. In one embodiment, CPU 120 transfers the address information via local bus 125 through buffer 122. The bus arbiter (not shown) exercises control over transfer bus 129, and as appropriate allows the transfer of the address from CPU 120 to interface controller 140 in a conventional manner.

Interface controller 140 receives the address associated with the starting address in local memory 190 where the first list element in the first scatter/gather list 72-1 is stored, and stores that address (starting address in local memory) in current pointer buffer 302 (Step 504). Thereafter, nested element handler 306 enables DMA engine 170 by starting or invoking the DMA engine 170 to retrieve the first element in the first scatter/gather list 72-1 according to the local memory address stored in the current pointer buffer 302 (Step 506). The DMA transfers the list element for the first scatter/gather list. The element 400 are stored in contiguous locations in local memory. In one embodiment of the present invention, DMA engine 170 retrieves all information in each element, local address pointer, system (PCI) address pointer, byte count, configuration byte, and link address pointer.

Nested element handler 306 processes the next elements. Nested element handler 306 stores the link address associated with the starting address in memory for the next element (as indicated by link address pointer 408) in current pointer buffer 302 (Step 508). DMA engine 170 determines the type of transfer request ( for example, read or write transfer request) associated with the scatter/gather list from the setting of transfer configuration byte 404 (Step 510). If a DMA read operation is indicated, as for example, during a disk write operation from the system. DMA engine 170 is enabled to perform a transfer (read) from system memory starting at the address indicated by system (PCI) address pointer 402, the number of bytes being indicated by byte count 406 from system memory 160 (Step 512). DMA engine 170 transfers the appropriate bytes from system memory 190 and writes them to local memory 160 (Step 514).

If a DMA write operation is indicated, for example as for a disk read operation, then DMA engine 170 is enabled to perform a transfer (write) to system memory by reading from local memory 190, starting at the address indicated by local address pointer 401, the number of bytes indicated by byte count 406 (Step 516). DMA engine 170 transfers the appropriate bytes and writes them to system memory 160 (Step 518).

After the data has been transferred by DMA engine 170, nested element handler 306 checks the status of the link bit 454 to determine if more links in the scatter/gather linked list are to be processed (Step 520). If no more links are to be processed, then the scatter/gather operation terminates (Step 521). If the enabler interrupt bit is set, an interrupt will be sent to the CPU. Typically, an interrupt is sent on the end of the last element of the scatter/gather list.

Recall that in some embodiments of the invention, multiple scatter/gather list processing requests may exist concurrently and that some such requests may arise during the processing of a previous request. Normally, a subsequent interrupt request is assumed by the interface controller to have a higher priority than an earlier request. This first-in-first-out treatment of the requests facilitates completion of the requests in the order received. However, in one embodiment of the present invention, if a new address has been loaded in a interrupt buffer 307, then the request (the "interrupt request") is assumed to have a higher priority than the current (or earlier) request being processed. Therefore, depending upon the particular rules implemented in the system for handling multiple requests, the procedure may vary to accommodate the rules, when more than one request is pending. This processing need not always maintain first-in-first-out interrupt handling.

One exemplary set of rules for handling and prioritizing interrupt requests are fixed in priority to each of the interrupt buffer. For multiple interrupt buffers, each with prescribed priority, the scatter/gather list associated with each interrupt buffer will be executed according to its priority. Multiply nested processing is also readily provided by the inventive system using a plurality of return element pointers. As higher priority requests are received, the request currently being processed may be suspended or "bumped" in favor of the newly received higher priority request. The priority of the current processing is normally compared at the end of each list element, and may be suspended to resume at the next element when its priority is again determined to be the highest. The CPU with this priority knowledge can deposit the next scatter/gather list to the proper interrupt buffer (based on its priority) and expect to get the scatter/gather list serviced sooner than later with respect to the other pending scatter/gather lists.

Alternatively, multiple DMA engines can be employed. The available DMA engines can process the next highest priority from the interrupt pointer buffer based on the fixed priority assignment. In more complex design, the priority information can be supplied by the CPU. The nested element handler needs to compare the priority information to which scatter/gather list has the highest priority at any instant of time. Other rules for handling and prioritizing interrupt requests may alternatively be used.

If more links (list elements) are to be processed (Step 520), and if newly received requests may have higher priority, then nested element handler 306 checks to see if another scatter/gather request has been received from CPU 120 (Step 522). In one embodiment of the present invention, CPU 120 may generate multiple scatter/gather list processing requests, for example in response to different urgency in which data is needed by the CPU. For example, command/status information, error information and data payload may be treated differently in the urgency which it's needed. Also, commands are typically shorter and processed much more quickly than data. Therefore, it will frequently be desirable to process a command with a higher priority than data alone, and also usually more expedient to process a command/data combination item than a data only item. In a RAID controller, even data payload can be treated according to its priority. Each scatter/gather request is received from CPU 120 at interface controller 140 by nested element handler 306. The starting address associated with the next element in the scatter/gather list is stored separately in one of the nested return pointer buffers 304. In one embodiment of the system two separate interrupt buffers are provided, but more than two are desirable for providing extended nesting capability. Providing two return buffers may for example be sufficient to store two data type requests in favor of higher priority command type requests.

If no other scatter/gather requests have been received, then nested element handler 306 initiates the transfer or retrieval of the next list element in the current scatter/gather list as indicated by the address stored in first buffer 302 (Step 524). Nested element handler 306 enables DMA engine 170 which retrieves the next element according to the address stored in current buffer 302. This process repeats (at step 508) where the nested element handler processes the next elements by storing the link address associated with the starting address in memory for the next element in current pointer buffer 302, until the scatter/gather list processing is complete.

If a scatter/gather list in the interrupt pointer buffer processing request has been received, then nested element handler 306 copies the link address stored in current buffer 302 (associated with the starting address of the next list element to be processed in the current scatter/gather list) to the appropriate nested return buffer 305 (Step 526). The information in the interrupt buffer will be transferred to the current buffer. Thereafter, DMA engine 170 retrieves the first list element of the scatter/gather list in the interrupt buffer. Nested element handler 306 enables DMA engine 170 to correctly retrieve the first element in the scatter/gather list of the interrupt buffer. The list element is processed resulting in the transfer of data between local and system memory (Step 529).

Thereafter, a check is made by the nested element handler 306 to determine if there are more elements in the "interrupt" scatter/gather list to be processed (Step 530). If there are no more elements in the current buffer, then the link addres is transferred from the last return buffer to the current buffer (Step 532). If it is determined that more elements exist in the current buffer(as indicated by the link bit 454 and the link address for the last element retrieved in the "interrupt" scatter/gather list), then a determination is made as to wheter at that time any higher priority requests have been received (Step 522). If not, then the next list element is retrieved from the current list (Step 524) and processing continues from Step 508 as described. If on the other hand, a higher priority request has been received, then the link address stored in the current buffer is copied to the nested return buffer (Step 526) as described. This essentially places processing of that request at a lower priority than the one newly received, and nests the earlier lower-priority requests for later processing. The next element in the "interrupt" scatter/gather list is then retrieved (Step 528). The "interrupt" scatter/gather list is thereafter operated on until completion.

The "interrupt" scatter/gather list is essentially processed from the current pointer buffer. The "interrupted" scatter/gather list has been nested in the nested return pointer buffer. Multiple nesting is supported so long as an appropriate number of return buffers and return buffer pointers are provided to store and address. Some degree of control therefore resides with the nested element handler sequencer, and the DMA engine executes the next element nested on the current pointer buffer.

Upon the completion of the interrupt scatter/gather list processing, the next address to be processed associated with the interrupted scatter/gather list is transferred from the appropriate return buffer 305 to first buffer 302 (Step 532). Thereafter, the next element in the first scatter/gather list is retrieved (Step 534). Processing of the first scatter/gather list is resumed until completion, or the next interrupt is serviced.

As will readily be appreciated, multiple nested scatter/gather lists may be processed by nested element handler 306. Specifically, each scatter/gather request received from CPU 120 may include priority information. The priority information identifies priority of the associated scatter/gather list and is stored in the interrupt pointer buffer 307. Upon the receipt of a new scatter/gather request, a comparison is made between the priority level of the current list being processed and the new request received. If the priority of the new request is higher than the priority of the current list being processed, then the current process may be interrupted, in order to enable the processing of the higher priority request. This priority scheme will allow dynamic priority assignment by the CPU.

In this embodiment, a queue of priority tasks comprising scatter/gather list address pointer and priority assigned to it is stored in the interrupt pointer buffer which indicates the ordering of servicing the interrupt pointer buffers 304. Accordingly, at the completion of a transfer associated with a given list element, a comparison is made to determine the highest priority request currently pending and the highest priority request currently pending will be serviced next by the scatter/gather mechanism. The manner in which multiple nested scatter/gather lists are handled using priority information is illustrated in the flowchart of FIG. 5 particularly relative to Steps 522–534.

Those ordinarily skilled in the art will recognize that the PCI interface 140 (or other system interface, such as for example, PCI-X) may be configured to have a plurality of buffers for nesting a plurality of link lists according to priorities generated by the host. Accordingly, more than two link lists can be pending at a given time depending on the priorities set by the CPU. In one embodiment of a multiple nested processing system, the number of buffers maintained in addition to the current buffer 302 would be equal to the number of nested scatter/gather lists allowed for a given application.

The foregoing description, for purposes of explanation, used specific nomenclature to provide a thorough understanding of the invention. However, it will be apparent to one skilled in the art that the specific details are not required in order to practice the invention. In other instances, well known devices, components, and/or procedures are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. All references contained herein are incorporated by reference.

What is claimed is:

1. A method of streaming data transfers from scattered locations or to a gathered location in a memory, the method comprising steps of:

manipulating the transfer of data between memory devices by processing, an element at a time, entries in a first scatter/gather list;

enabling interruption of said manipulating for a subset of said elements;

upon receipt of a request to process a second scatter/gather list, interrupting the processing of the first scatter/gather list when interruption is enabled; and resuming the processing of the first scatter/gather list upon the completion of the processing of the second scatter/gather list.

2. The method of claim 1, wherein the step of interrupting the processing of the first scatter gather list interrupts only at the completion of the processing of an element of the first scatter/gather list and prior to the retrieval of the next element in the first scatter/gather list.

3. The method of claim 1, wherein the interrupting step further includes steps of: storing the next address to be processed in the first scatter/gather list; and retrieving the first element in the second scatter/gather list.

4. The method of claim 1, wherein:

the first scatter/gather list has a first priority, and the second scatter/gather list has a second priority; and the interrupting step is only performed if the priority of the second scatter/gather list is higher than the priority of the first scatter/gather list.

5. The method of claim 4, wherein if the priority of the second scatter/gather list is lower than the priority of the first scatter/gather list, the method further comprises the step of delaying the processing of the second scatter/gather list until the processing of the first scatter/gather list is complete.

6. The method of claim 5, wherein the step of delaying the processing of the second scatter/gather list further includes the step of storing the address in memory of the first element of the second scatter/gather list.

7. The method of claim 6, wherein said delay in said processing of said scatter/gather lists is a multiply-nested delay having a plurality of different nested priorities.

8. The method of claim 1, wherein said interrupting and resuming is a multiply-nested interrupting and resuming wherein each of multiple requests have different nested priorities.

9. The method of claim 1, wherein enabling interruption comprises a transfer interrupt enabler flag for enabling and disabling said interruption.

10. The method of claim 9, wherein said transfer interrupt enabler flag is evaluated after said processing of said element.

11. The method of claim 1, wherein enabling interruption toggles between an interrupt enabled and an interrupt disabled for each successive element processed.

12. The method of claim 11, wherein said interrupt enabled allows said interrupting, and said interrupt disabled delays said interrupting.

13. A scatter/gather mechanism for streaming transfers, which includes at least one element, between a first and second memory device without processor or firmware intervention, the scatter/gather mechanism comprising:

a transfer engine for streaming data transfers between dispersed locations in one memory device to a gathered location in a second memory device;

means for enabling suspension of a current transfer request for a subset of said elements;

means for suspending the processing of the current transfer request upon the receipt of a second transfer request when said means for enabling is enabled; and means for resuming the processing of a suspended transfer request including a return pointer for indicating the starting address of a next element to be processed in an transfer operation which has been suspended.

14. A computer program product for use in conjunction with a computer system, the computer program product comprising a computer readable storage medium and a computer program mechanism embedded therein, the computer program mechanism, comprising:

a program module that directs the computer system or components thereof, to function in a specified manner to stream data transfers from scattered locations or to a gathered location in a memory, the program module including instructions for:

manipulating the transfer of data between memory devices by processing, an element at a time, entries in a fist scatter/gather list;

enabling interruption of said manipulating for a subset of said elements;

processing of the first scatter/gather list when interruption is enabled; and upon receipt of a request to process a second scatter/gather list, interrupting the processing of the first scatter/gather list when interruption is enabled; and resuming the processing of the first scatter/gather list upon the completion of the processing of the second scatter/gather list.

15. The computer program product of claim 14, wherein the instruction for interrupting the processing of the first scatter gather list interrupts only at the completion of the processing of an element of the first scatter/gather list and prior to the retrieval of the next element in the first scatter/gather list.

16. The computer program product of claim 14, wherein the interrupting further includes instructions for: storing the next address to be processed in the first scatter/gather list; and retrieving the first element in the second scatter/gather list.

17. The computer program product of claim 14, wherein the first scatter/gather list has a first priority, and the second scatter/gather list has a second priority; and the interrupting is only performed if the priority of the second scatter/gather list is higher than the priority of the first scatter/gather list.

18. The computer program product of claim 17, wherein if the priority of the second scatter/gather list is lower than the priority of the first scatter/gather list, the method further comprises the step of delaying the processing of the second scatter/gather list until the processing of the first scatter/gather list is complete.

19. The computer program product of claim 18, wherein the step of delaying the processing of the second scatter/gather list further includes the step of storing the address in memory of the first element of the second scatter/gather list.

20. A computer system including a processor and first and second memory devices, and the computer system comprising:

means for streaming transfers of data between the first and the second memory devices without intervention of the processor or firmware and including a scatter/gather means, where the data is transferred between the first and second memory device in segments according to instructions in a scatter/gather list, the scatter/gather means services a single transfer request at a time, the scatter/gather means further comprising:

a transfer engine streaming transfers between dispersed locations in the first memory device to a gathered location in a second memory device; and a transfer controller for processing transfer requests including:

first processing means for processing a scatter/gather list associated with a current transfer request, a suspension means for enabling suspension of a current transfer request for a subset of said segments, and an interrupt means for servicing a priority transfer request when said means for enabling suspension is enabled by suspending the current transfer request until the completion of the servicing of the priority transfer request.

21. The computer system in claim 20, wherein said first and said second memory devices comprise disk drive storage devices.

22. The computer system in claim 20, wherein said interrupt means for servicing a priority transfer request by suspending the current transfer request until the completion of the servicing of the priority transfer request provides interrupt means for a plurality of suspended transfer requests, each said suspended transfer request being serviced according to an associated service priority.

* * * * *